US008590369B2

(12) United States Patent
Johnson et al.

(10) Patent No.: US 8,590,369 B2
(45) Date of Patent: Nov. 26, 2013

(54) VEHICLE DRIVETRAIN TEST STAND AND METHOD OF CONTROLLING SAME

(75) Inventors: Donald Bryce Johnson, Algonac, MI (US); Norman Malcolm Newberger, White Lake, MI (US); Isaac Cohen Anselmo, Livonia, MI (US)

(73) Assignee: Horiba Instruments, Inc., Irvine, CA (US)

( * ) Notice: Subject to any disclaimer, the term of this patent is extended or adjusted under 35 U.S.C. 154(b) by 223 days.

(21) Appl. No.: 12/977,428

(22) Filed: Dec. 23, 2010

(65) Prior Publication Data

US 2012/0160023 A1    Jun. 28, 2012

(51) Int. Cl.
*G01M 15/00* (2006.01)

(52) U.S. Cl.
USPC ........................................... 73/116.06

(58) Field of Classification Search
USPC ................. 73/116.02, 116.05, 116.06
See application file for complete search history.

(56) References Cited

U.S. PATENT DOCUMENTS

| | | | |
|---|---|---|---|
| 3,905,225 A | 9/1975 | Moss et al. | |
| 4,466,294 A * | 8/1984 | Bennington et al. | 73/862.13 |
| 4,939,985 A | 7/1990 | Von Thun | |
| 5,109,696 A | 5/1992 | Bright et al. | |
| 5,621,168 A | 4/1997 | Kim et al. | |
| 6,634,218 B1 | 10/2003 | Nakanishi et al. | |
| 6,651,493 B2 * | 11/2003 | Myers et al. | 73/116.05 |
| 6,754,615 B1 | 6/2004 | Germann et al. | |
| 7,530,263 B2 * | 5/2009 | Sowle | 73/118.01 |
| 7,926,336 B2 * | 4/2011 | Vickio et al. | 73/116.05 |
| 8,418,542 B2 * | 4/2013 | Mayrhofer et al. | 73/116.05 |
| 8,434,352 B2 * | 5/2013 | Dank et al. | 73/116.05 |
| 2008/0173101 A1 * | 7/2008 | Sowle | 73/862.09 |
| 2009/0126510 A1 | 5/2009 | Engstrom | |
| 2010/0050759 A1 * | 3/2010 | Vickio et al. | 73/116.06 |

FOREIGN PATENT DOCUMENTS

EP    0338373 A2    10/1989

OTHER PUBLICATIONS

Bryce Johnson, Engine, Battery and Vehicle Simulation Strategies for Transmission Testing, Proceedings of the 2009 Ground Vehicle Systems Engineering and Technology Symposium, Horiba Instruments, Troy, Michigan, 14 pgs.
International Search Report and Written Opinion of the International Searching Authority, dated May 3, 2012 for Application No. PCT/US2011/066835, filed Dec. 22, 2011, 10 pgs.

* cited by examiner

*Primary Examiner* — Freddie Kirkland, III
(74) *Attorney, Agent, or Firm* — Brooks Kushman P.C.

(57) ABSTRACT

A test stand may include a clutch operatively arranged with a dynamometer and a flywheel. The test stand may further include a controller configured to control the clutch to decouple a rotating inertia of the dynamometer from a rotating inertia of the flywheel such that the rotating inertia of the flywheel exhibits a desired rotating inertia.

12 Claims, 3 Drawing Sheets

VEHICLE DRIVETRAIN TEST STAND AND METHOD OF CONTROLLING SAME

BACKGROUND

Test stands may be used to test the powertrain of a vehicle by simulating the rolling resistance of the wheels and the acceleration performance of the vehicle by way of electric load machines mounted on the drive shafts.

SUMMARY

A clutch may be configured to variably transfer torque between a dynamometer and a vehicle drivetrain according to a determined force representing a tire being simulated by the dynamometer and slip when a torque in the vehicle drivetrain exceeds a value based on the determined force.

DETAILED DESCRIPTION

Figure 1:
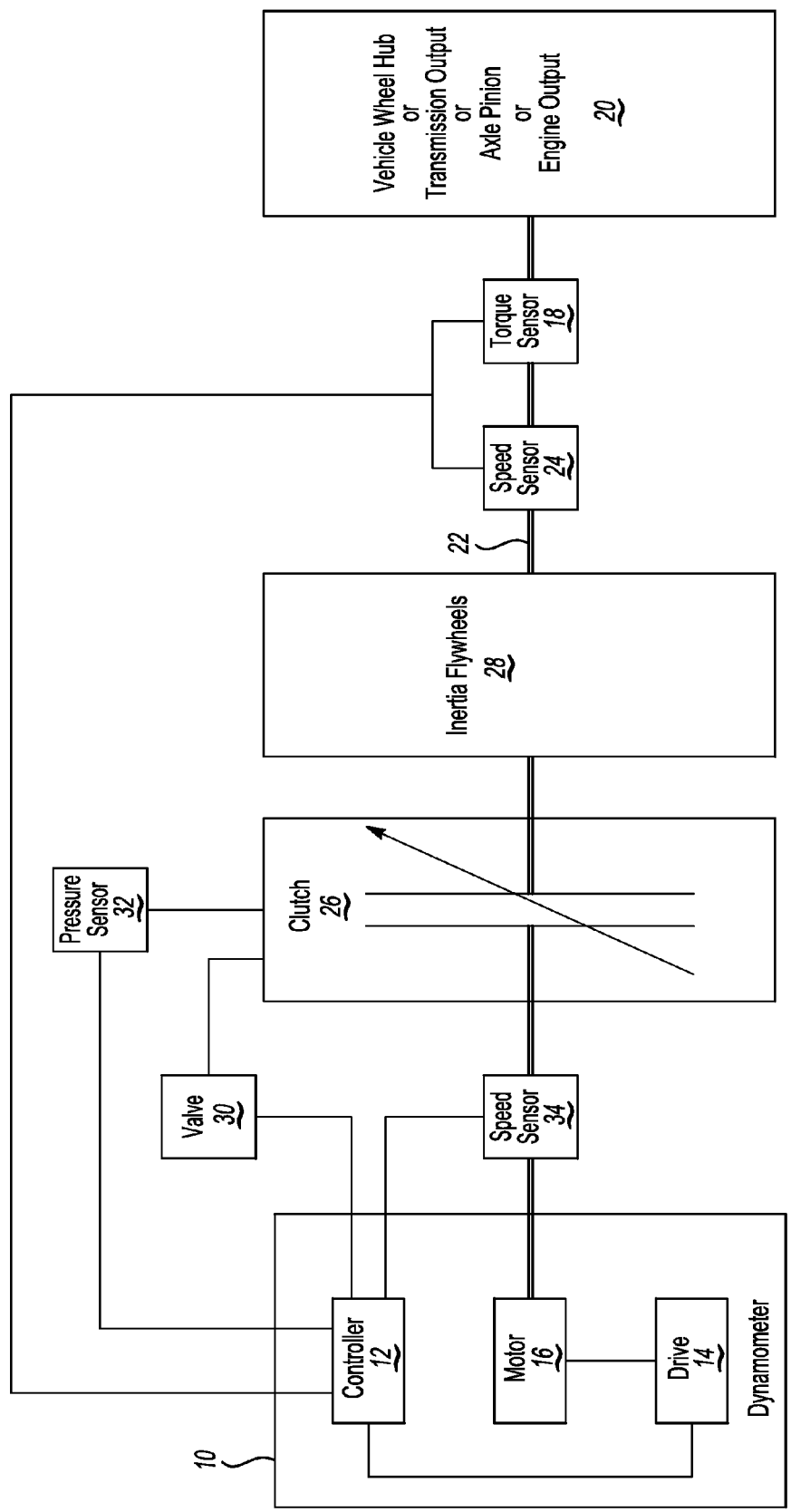
FIG. 1 is a block diagram of a test stand for a vehicle.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Dynamometers used as loading units on powertrain test stands may have a relatively large inertia (e.g., 5 to 10 kgm$^2$). So called high inertia, low dynamic dynamometers are common in industry. These dynamometers replace a relatively small inertia (e.g., 1 kgm$^2$) when simulating, for example, a tire and wheel assembly. Proper wheel slip simulation, however, requires the inertia seen by the vehicle to be the same as the tire and wheel assembly being simulated in order to reproduce driveline natural frequency, wheel force, axle torque, speeds, damping and amplitudes. (The terms wheel slip and tire slip are used interchangeably herein.)

Certain conventional wheel slip simulation techniques require the use of low inertia, high dynamic dynamometers as high inertia, low dynamic dynamometers may not accelerate and/or decelerate quickly enough for wheel slip simulation during a wheel spin event. Low inertia, high dynamic dynamometers, however, may be relatively expensive and less commonly available. It may therefore be desirable to use high inertia, low dynamic dynamometers to execute wheel slip algorithms.

Typically, a clutch may be used to isolate the torque from, for example, an engine or dynamometer to a transmission. As an example, an automobile clutch may be used to disconnect the transmission from the engine. As another example, a clutch may be used to limit torque to prevent damage to a rotating shaft. Here a clutch is arranged, in certain embodiments, between a drivetrain and dynamometer and is used to isolate the rotating inertia of the dynamometer from that of the drivetrain during, for example, a spin event. As an example, the clutch may provide both wheel slip and wheel spin event simulation. Such a clutch may need to be rated for large heat absorption as it is always slipping. As another example, the clutch may provide only spin event simulation. The clutch may be set to release at a torque value equal to the torque needed to simulate the spin event. As yet another example, the clutch may be controlled in such a way to only slip when the inertia simulation of the motor attempts to accelerate or decelerate the motor beyond its capabilities.

As mentioned above, the clutch may be allowed to slip in the same fashion as a tire slips on a road surface. A continuously slipping clutch, however, may produce excessive heat and wear. Alternatively, the clutch may be allowed to slip when the rotating inertia of the dynamometer would hinder the proper simulation of the tire slip event. This may happen during acceleration. By limiting the force through the clutch to, for example, the tire force, the vehicle drivetrain effectively sees only the rotating inertia that is on the drivetrain side of the clutch. Other control schemes contemplated herein may also produce the same result.

Figure 3:
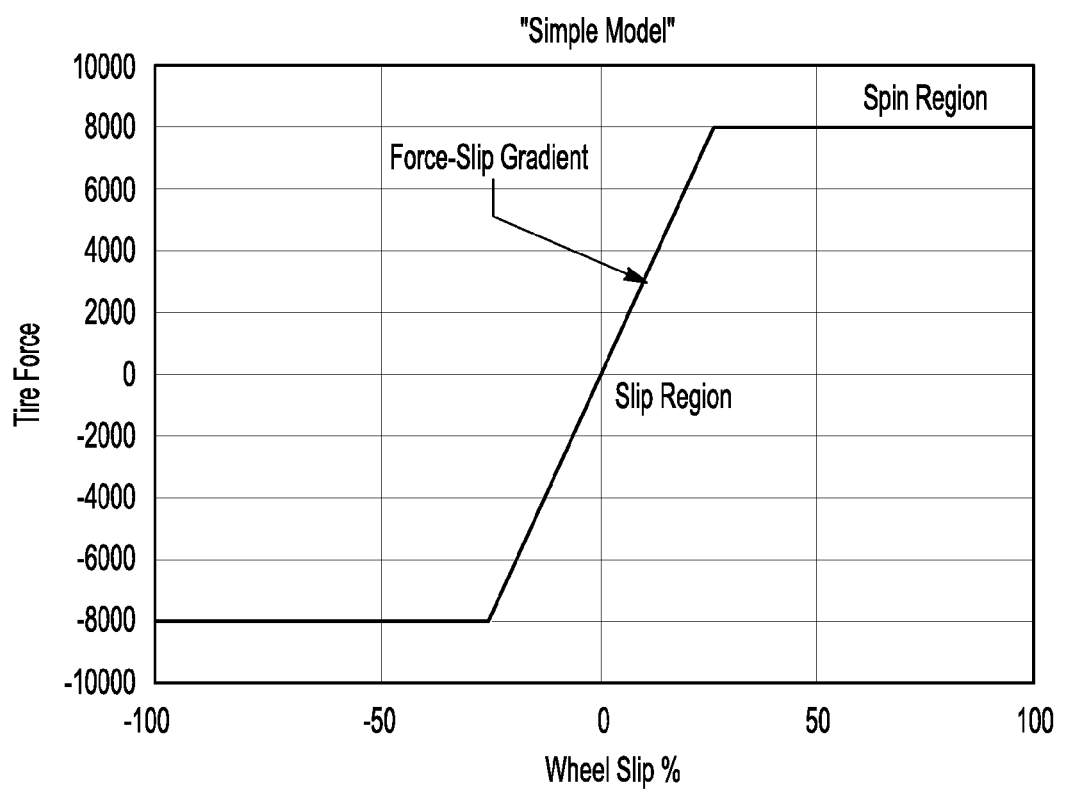
FIG. 3 is a plot of tire force versus wheel slip.

One solution may set the clutch force (which is a function of the tire radius and the torque transmitted through the clutch) equal to the tire (determined) force (e.g., forces transmitted between the tire and road surface). The tire force may be determined, for example, in a known fashion according to a slip versus force function as illustrated in FIG. 3. A small increment in force created by the vehicle drivetrain results in a small increment in acceleration of the inertia of flywheels, but not the inertia of a dynamometer because the clutch slips by an equivalent small amount. The effect is to decouple the inertia of the dynamometer from that of the flywheels and vehicle. The result is that the flywheels accelerate at a rate defined by their inertia and a force applied to that inertia. The force arises from the difference between the tire force and the force generated by the vehicle driveline.

The inertia of a dynamometer, in one application, may be decoupled from the inertia of a transmission input dynamometer (a dynamometer that connects to an input of a transmission). In such a test stand, item 20 (FIG. 1) would be the input to a transmission in a powertrain test stand. The input dynamometer should exhibit the inertial characteristics of an engine. Typically, such an input dynamometer is a so called low inertia dynamometer. Such dynamometers may be costly. Solutions presented herein may allow most any dynamometer to be used with a shear clutch to isolate the inertia of the dynamometer from the input to the transmission. Force control of the clutch may be implemented in a manner similar to the tire/wheel implementation discussed herein.

Control algorithms may be implemented to control the clutch described above. The demand value (e.g., tire force of FIG. 2) to the clutch controller, as an example, may be the slip speed of the clutch. This clutch controller is then simply a speed controller. The demand value to the clutch control, as another example, maybe a torque demand. This clutch controller may then implement either an open or closed loop torque control to control the torque across the clutch. Such a solution may also be implemented as a speed controller where the speed across the clutch is defined by a spin speed. The demand value to the clutch control, as yet another example, may be an inertia demand that the clutch controller will control.

Referring to FIG. 1, a dynamometer 10 may include a controller 12, drive 14 and motor 16. The drive 14 is in communication with/under the control of the controller 12 and drives the motor 16. A torque sensor 18 may be mechanically connected between the motor 16 and a vehicle drivetrain 20 along shafting 22, thus measuring torque in the vehicle drivetrain 20. The torque sensor 18 may be in communication with the controller 12. A speed sensor 24 for the drivetrain 20 may be mechanically connected with the shafting 22. Information from this sensor 24 may be used for speed control of the motor 16.

A clutch 26 and inertia flywheels 28 (inertial element) may be disposed between the dynamometer 10 and speed sensor 24 along the shafting 22. The clutch 26, in the embodiment of FIG. 1, is connected to an output shaft of the motor 16 and may be controlled via a valve 30 operatively arranged with the clutch 26, and using a pressure control loop that depends, at least in part, on information from a pressure sensor 32 operatively arranged with the clutch 26 and in communication with the controller 12. Other clutch control loops, however, are contemplated.

A speed sensor 34 in communication with the controller 12 may be mechanically connected with the shafting 22 on either side of the motor 16. As illustrated, the speed sensor 34 is disposed along the shafting 22 between the motor 16 and clutch 26. Information from the speed sensor 34 may be used to control the motor 16 and/or clutch 26.

The rotating inertia of the inertia flywheels 28 in combination with the rotating inertia of the sensors 18, 24, the rotating inertia of a portion of the clutch 26 adjacent to the sensors 18, 24, and the rotating inertia of the corresponding shafting 22 form the equivalent rotating inertia of, for example, a simulated tire and wheel assembly (and/or other simulated components normally attached to the drivetrain 20). This equivalent rotating inertia should be the same as the rotating inertia of the components being simulated.

The controller 12 may provide control of the drive 14 that operates the motor 16. The controller 12 may also control the clutch 26 so as to mimic, for example, the slipping of the simulated tire or to mimic the slipping of the simulated tire only during acceleration. The slipping of the tire may occur when the drivetrain torque exceeds the product of the tire force and tire radius (a value based on the determined force).

While FIG. 1 only shows a single dynamometer configuration for a single input to the vehicle drivetrain 20, it is understood that such a configuration could be attached to each of the wheel hubs on a vehicle that contains any number of wheels (e.g., 10 wheels).

Figure 2:
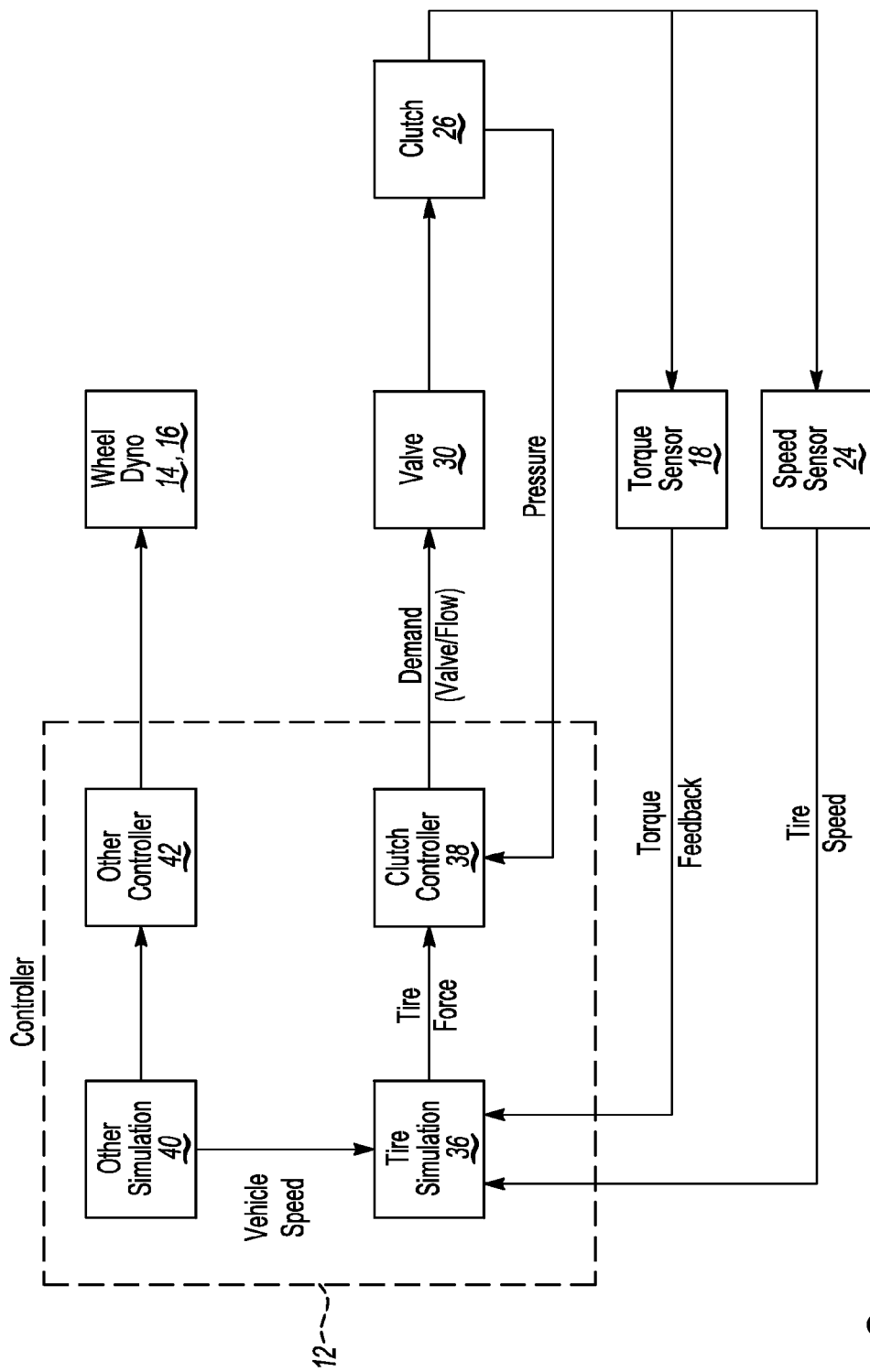
FIG. 2 is a block diagram illustrating the control arrangement, drive and motor of FIG. 1.

Referring to FIG. 2, a tire simulation 36 may calculate a tire force based on tire speed information from the speed sensor 24 and torque information from the torque sensor 18. A clutch controller 38 may calculate a pressure necessary to transmit this torque through the clutch 26. The clutch controller 38 may close a pressure loop and demand a valve flow to the valve 30 to create the proper pressure in the clutch 26. The clutch 26, in the embodiment of FIG. 2, is a device that transmits torque as a function of pressure. Tire force may be used as the desired setpoint to the clutch controller 38. Speed differences across the clutch 26 or inertia control of the clutch 26 may also be appropriate. Other clutches (e.g., wet clutch, multi-disk clutch, dry clutch, etc.) and control schemes (described herein), however, may be used.

Control of the motor 16 through the drive 14 may be accomplished by any suitable/known wheel control solution. These solutions may require a simulation 40 containing a vehicle simulation and/or wheel slip model. A vehicle speed for the simulated tire may be required from the simulation 40 to allow the tire simulation 36 to determine slip speed so that tire force may be determined. Alternatively, a control methodology using slip speed instead of tire force may be the setpoint value to the clutch controller 38 from the tire simulation 36. In such a case, the speed across the clutch is controlled rather than the torque through the clutch.

The tire simulation 36 may contain a wheel slip model, as illustrated in FIG. 3, which determines tire force as a function of slip. The wheel slip model of FIG. 3 is representative of a simple model that could alternatively be replaced by any number of well known tire models, such as a Pacejka tire model. Wheel slip is logically divided into two regions of operation. The first (slip) region describes conditions in which the wheel slips based on a one-to-one function of slip and tire force. In this region, there is only one slip value for each value of tire force and vice-versa (commonly known as the slip region). The second (spin) region describes conditions in which there may be more than one value of slip for a given tire force (commonly known as the spin region). In the spin region, the acceleration of the tire is determined solely by the resulting force acting on the inertia of the tire. The tire speed due to this acceleration is calculable as described above.

In certain implementations, slip may be calculated as $$100\% * (V\text{Tire} - V\text{Vehicle}) / V\text{Vehicle}$$

where VTire is the tire velocity and VVehicle is the vehicle velocity. The tire force may then be determined by the point on the curve corresponding to the slip value from the above calculation. Alternatively, the wheel slip value may be calculated from the tire force, and the clutch controller 38 may control speed across the clutch 26 as a function of the slip speed. The tire force is calculated from the torque measured in the drivetrain as follows $$\text{Measured Torque} = \text{Tire Force} * \text{Tire Radius} + \text{Tire Acceleration} * \text{Tire and Wheel Inertia}$$

where Tire Radius and Tire and Wheel Inertia are given and Tire Acceleration is derived from simulated tire speed.

The algorithms disclosed herein may be deliverable to a processing device, which may include any existing electronic control unit or dedicated electronic control unit, in many forms including, but not limited to, information permanently stored on non-writable storage media such as ROM devices and information alterably stored on writeable storage media such as floppy disks, magnetic tapes, CDs, RAM devices, and other magnetic and optical media. The algorithms may also be implemented in a software executable object. Alternatively, the algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A test stand for a vehicle drivetrain comprising:
    a clutch configured to (i) variably transfer torque between a dynamometer and the vehicle drivetrain according to a determined force representing a tire being simulated by the dynamometer and (ii) slip when a torque in the vehicle drivetrain exceeds a value based on the determined force.

2. The test stand of claim 1 wherein a difference between the torque in the vehicle drivetrain and the force of the tire being simulated is used to accelerate an inertial element operatively arranged with the clutch and the vehicle drivetrain.

3. The test stand of claim 2 wherein the rotating inertia of the inertial element is at least equal to the rotating inertia of the tire being simulated.

4. The test stand of claim 1 further comprising a controller configured to control the torque transferred through the clutch based on a speed of the tire being simulated and the torque in the drivetrain.

5. The test stand of claim 1 further comprising a controller configured to control a speed across the clutch based on a difference in speed between the tire being simulated and the dynamometer.

6. A test stand comprising:
a clutch operatively arranged with a dynamometer and a flywheel; and
a controller configured to control the clutch to decouple a rotating inertia of the dynamometer from a rotating inertia of the flywheel such that the rotating inertia of the flywheel exhibits a desired rotating inertia.

7. The test stand of claim 6 wherein the controller controls the clutch according to a measured torque.

8. A method of testing a vehicle drivetrain comprising:
causing a variable transfer of torque between a dynamometer and the vehicle drivetrain via a clutch according to a determined force representing a tire being simulated by the dynamometer; and
causing the clutch to slip when a torque in the vehicle drivetrain exceeds a value based on the determined force.

9. The method of claim 8 further comprising causing an inertial element operatively arranged with the clutch and vehicle drivetrain to accelerate based on a difference between the torque in the vehicle drivetrain and the force of the tire being simulated.

10. The method of claim 9 wherein the rotating inertia of the inertial element is at least equal to the rotating inertia of the tire being simulated.

11. The method of claim 8 wherein the torque transferred through the clutch is controlled based on a speed of the tire being simulated and the torque in the drivetrain.

12. The method of claim 8 further comprising controlling a speed across the clutch based on a difference in speed between the tire being simulated and the dynamometer.

* * * * *